United States Patent
Mosdale et al.

(10) Patent No.: US 9,601,741 B2
(45) Date of Patent: Mar. 21, 2017

(54) FUEL CELL CONNECTOR AND METHOD OF USING THE SAME

(71) Applicant: Paxitech, Echirolles (FR)

(72) Inventors: Renaut Mosdale, Claix (FR); Séverine Andrada, La Buisse (FR)

(73) Assignee: Paxitech, Echirolles (FR)

( * ) Notice: Subject to any disclaimer, the term of this patent is extended or adjusted under 35 U.S.C. 154(b) by 0 days.

(21) Appl. No.: 15/062,183

(22) Filed: Mar. 6, 2016

(65) Prior Publication Data

US 2016/0248069 A1  Aug. 25, 2016

Related U.S. Application Data

(63) Continuation of application No. 14/139,557, filed on Dec. 23, 2013, now abandoned.

(30) Foreign Application Priority Data

Dec. 28, 2012 (FR) .................................. 12 03613

(51) Int. Cl.
*H01M 2/20* (2006.01)
*H01M 8/02* (2016.01)
(Continued)

(52) U.S. Cl.
CPC .......... *H01M 2/202* (2013.01); *H01M 8/006* (2013.01); *H01M 8/0206* (2013.01); *H01M 8/0247* (2013.01); *H01M 8/0284* (2013.01); *H01M 8/1004* (2013.01); *H01M 8/2418* (2016.02); *H01M 8/2465* (2013.01); *H01M 8/0286* (2013.01); *H01M 8/0297* (2013.01); *Y02E 60/50* (2013.01)

(58) Field of Classification Search
CPC .. H01M 2/202; H01M 8/0247; H01M 8/2465; H01M 8/006; H01M 8/0284; H01M 8/206; H01M 8/2418; H01M 8/1004; H01M 8/0286; H01M 8/0297
See application file for complete search history.

(56) References Cited

U.S. PATENT DOCUMENTS

2004/0018415 A1  1/2004  Lai et al.
2006/0115706 A1  6/2006  Maeda et al.
(Continued)

FOREIGN PATENT DOCUMENTS

EP          2061114        5/2009
JP          2005268039     9/2005
(Continued)

OTHER PUBLICATIONS

USPTO, Non-Final Office Action in parent U.S. Appl. No. 14/139,557, Sep. 4, 2015.
(Continued)

*Primary Examiner* — Jane Rhee
(74) *Attorney, Agent, or Firm* — Kevin R. Erdman; Brannon Sowers & Cracraft PC

(57) ABSTRACT

The present invention involves an electrically-conductive fuel cell electrode connector, the connector including an opening and a slot, the slot connecting an interrupted external edge of the connector to the opening to delimit a first flap and a second flap of the connector. A method of using the connector comprising a step of deforming the connector to be able to insert a module of unit cells into the connector opening.

12 Claims, 3 Drawing Sheets

(51) Int. Cl.
*H01M 8/24* (2016.01)
*H01M 8/00* (2016.01)
*H01M 8/10* (2016.01)

(56) References Cited

U.S. PATENT DOCUMENTS

| | | |
|---|---|---|
| 2008/0261088 A1 | 10/2008 | Cha et al. |
| 2008/0299435 A1 | 12/2008 | Imura et al. |
| 2009/0123803 A1 | 5/2009 | Faucheux et al. |
| 2010/0068562 A1 | 3/2010 | Fukushima |

FOREIGN PATENT DOCUMENTS

| | | |
|---|---|---|
| JP | 2010182451 | 8/2010 |
| JP | 2010182451 A | 8/2010 |
| JP | 2011233342 | 11/2011 |

OTHER PUBLICATIONS

USPTO, Restriction Requirement in parent U.S. Appl. No. 14/139,557, Jun. 19, 2015.
Applicant, Response to Restriction requirement in parent U.S. Appl. No. 14/139,557, Aug. 17, 2015.
Institut National De La Propriete Industrielle, Search Report, dated Aug. 1, 2013 (FR 1203613, FA 776534).

FUEL CELL CONNECTOR AND METHOD OF USING THE SAME

CROSS-REFERENCE TO RELATED APPLICATION

This application is a continuation of U.S. patent application Ser. No. 14/139,557, filed Dec. 23, 2013, entitled "Fuel Cell Connector and Method of Using the Same", which claims the priority benefit of French Patent application number 12/03613, filed on Dec. 28, 2012, entitled "Connecteur pour cellules de pile à combustible et procédé de mise en oeuvre", the contents of which are hereby incorporated by reference in its entirety to the maximum extent allowable by law.

BACKGROUND

The present disclosure relates to fuel cells, and more specifically to an electrically-conductive connector for unit cell electrodes of a fuel cell operating, in particular, with dihydrogen and dioxygen.

DISCUSSION OF THE RELATED ART

Fuel cells enable, from a fuel and an oxidizer, to directly generate electric current. There exist many types of fuel cells. A cell operating with dihydrogen and dioxygen will be taken as an example. Such a fuel cell is generally formed of several unit cells which are electrically connected in parallel to deliver a significant current and/or in series to increase the voltage available across the cell. FIG. 1 is a simplified view of a known prior art unit cell. Unit cell 1 is formed of a pair 2 of two opposite-facing electrodes: a cathode 3; an anode 4. Cathode 3 is separated from anode 4 by a proton-exchange membrane 5, for example, a synthetic polymer such as NAFION® produced by DuPont™, having an approximate 50-μm thickness. Anode 4 and cathode 3 may be made of a felt which is at the same time electrically conductive, catalytic, and porous to dihydrogen and dioxygen. Dihydrogen $H_2$ is brought onto anode 4 and dioxygen $O_2$ is brought onto cathode 3. By catalytic effect, the gaseous molecules of dioxygen $O_2$ and dihydrogen $H_2$ disintegrate, causing the accumulation of protons ($H^+$) on cathode 3 and of electrons ($e^-$) on anode 4. An electric current can then be collected by electric conductors—not shown—laid on cathode 3 and anode 4.

FIG. 2 is a simplified perspective view of a fuel cell 6 having a planar architecture according to prior art. It comprises several unit cells 1, such as described in relation with FIG. 1, located on a median surface 7, for example, planar. Unit cells 1 of planar cell 6 are insulated from one another by electric insulation walls 8.

SUMMARY

An object of the present invention is to provide an electric connection system enabling to electrically connect unit cells of a fuel cell, and particularly of a planar cell, to overcome all or part of the disadvantages of existing electric connection systems.

Another object of the present invention is to provide reliable electric connections capable of being economically implemented over a set of unit cells, particularly when they are mechanically interconnected.

Another object of the present invention is to electrically connect in series two unit cells of a planar-type fuel cell.

Thus, an embodiment of the present invention provides a module comprising a strip of fuel cells, each having an upper electrode and a lower electrode, an upper electrode of a cell being electrically connected to a lower electrode of an adjacent cell by a connector comprising:
  a base (24);
  two arms (21, 23) extending in a same direction from two external edges of the base, the spacing between the two arms being greater than or equal to the width of the strip,
  two flaps (20, 22) extending towards each other from ends of the arms appended to their connection with the base.

Thus, another embodiment of the present invention provides a connector of electrodes (38, 39, 41, 42) of a fuel cell (31) of the module of the preceding paragraph, formed from a plate of a porous, deformable, and electrically-conductive felt, comprising:
  a base (24);
  two arms (21, 23) extending in a same direction from two external edges of the base,
  two flaps (20, 22) extending towards each other from ends of the arms opposed to their connection with the base.

Thus, further embodiment of the present invention provides a method of interconnecting unit cells (32, 33) of a module (30, 50) comprising a strip of fuel cells, each having an upper electrode and a lower electrode, comprising the steps of:
  arranging, on two opposite surfaces of the strip (34), a layer of an insulating material (51) of thermoplastic elastomer polymer type to leave the electrodes accessible;
  providing the connector (10) of claim 6 wherein the spacing between the two arms is greater than or equal to the strip width;
  introducing said module (30, 50) between the two arms of the connector (10), to bring an electrode of a cell in contact with the base and an opposite electrode of an adjacent cell in contact with the two flaps of the connector; and
  exerting a pressure, preferably with a heat input, perpendicularly to the membrane (34) on opposite surfaces of said module (30) to have the base and the two flaps of the connector adhere to the insulating film (51).

The present application also aims at a connector adapted to the above module.

The present application also aims at a fuel cell comprising the above-mentioned unit cell module.

The present application also aims at a unit cell interconnection method.

The foregoing and other objects, features, and advantages will be discussed in detail in the following non-limiting description of specific embodiments in connection with the accompanying drawings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
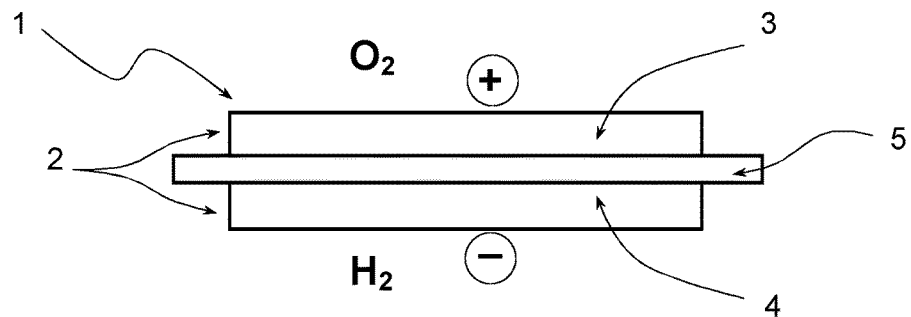
FIG. 1 is a cross-section view of a unit cell of a fuel cell, according to the above-described prior art.
Figure 2:
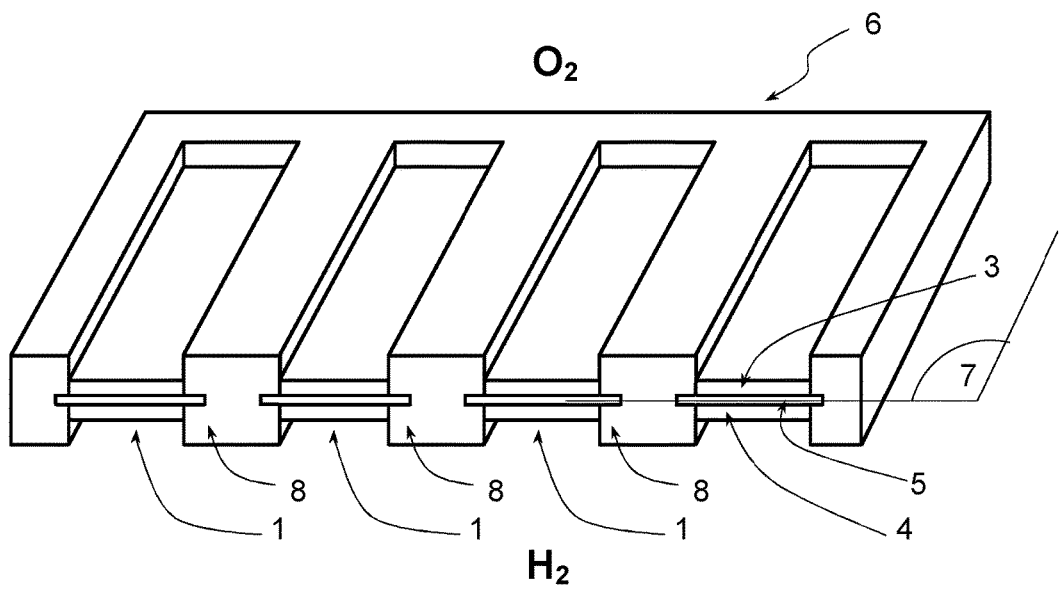
FIG. 2 is a simplified perspective cross-section view of a planar fuel cell, according to the above-described prior art.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DETAILED DESCRIPTION

For clarity, the same elements have been designated with the same reference numerals in the different drawings, which have been drawn out of scale. For clarity, only those elements which are useful to the understanding of the present invention have been shown and will be described. In particular, the forming of a unit cell of a fuel cell is known by those skilled in the art and will not be described.

Figure 3:
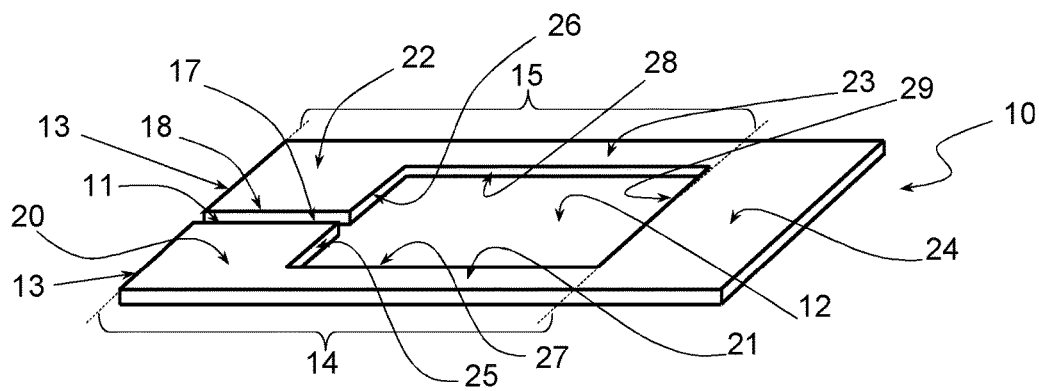
FIG. 3 is a perspective view of an electric connector according to the present invention.

FIG. 3 is a perspective view of an electrically-conductive connector 10 for fuel cell electrodes. In FIG. 3, connector 10 is in a so-called initial position where it is substantially planar. The thickness of connector 10 may be in the range from 20 μm and 5 mm and, preferably, from 50 μm to 150 μm. The outer shape of connector 10 is for example substantially parallelepipedal. For example, connector 10 may be made of connection felt comprising metal fibers, for example, made of stainless steel. Thus, connector 10 is both permeable to gases and electrically conductive. The resistivity of connector 10 is for example in the range from $1\times10^{-4}$ Ω·cm to $5\times10^{-2}$ Ω·cm and preferably from $1\times10^{-4}$ Ω·cm to $5\times10^{-3}$ Ω·cm. Connector 10 is naturally deformable, substantially resilient, and rigid. It will be within the abilities of those skilled in the art to adjust, especially by successive trials, the composition and the preparation of the connection felt to optimize its physical parameters, in particular its rigidity and its resilience, with a view to using the connection felt in the context of the present invention.

Connector 10 comprises a felt 11 and an opening 12, each of the two elements crossing the thickness of connector 10.

Slot 11 connects an external interrupted edge 13 of the connector 10 to opening 12 to delimit a first element 14 and a second element 15 of connector 10. It should be understood that slot 11 is open at its two ends.

According to an execution mode, the connector comprises first 20, second 22, and third 24 contact elements and first and second connection elements or arms 21 and 23. The first and second contact elements form first and second flaps 20, 22. The first and second flaps are attached to the third contact element or base 24 by means of first 21 and second 23 arms, each of which is connected to base 24. Preferably, connector 10 is in one piece, in other words, it may be formed from an adequately cut connection felt.

Opening 12, for example, rectangular and located towards the central portion of connector 10, is delimited and surrounded:

for a first side of opening 12, by a first internal edge 25 belonging to first contact element 20 and by a second internal edge 26 belonging to second contact element 22;

for second and third sides of opening 12 respectively extending at opposite ends on the first side, by a first internal side 27 belonging to first arm 21 and by a second internal side 28 belonging to second arm 23; and for a fourth side of the opening opposite to the first side, by a third internal edge 29 belonging to third contact element 24.

In other words, opening 12 is delimited by: first 25, second 26, and third 29 internal edges of connector 10 respectively associated with first and second flaps 20, 22 and with base 24; first 27 and second 28 internal sides of connector 10 respectively associated with first and second arms 21 and 23.

First 17 and second 18 walls of slot 11 join external interrupted edge 13 of connector 10 respectively at first 25 and second 26 internal edges of connector 10.

Figure 4A:
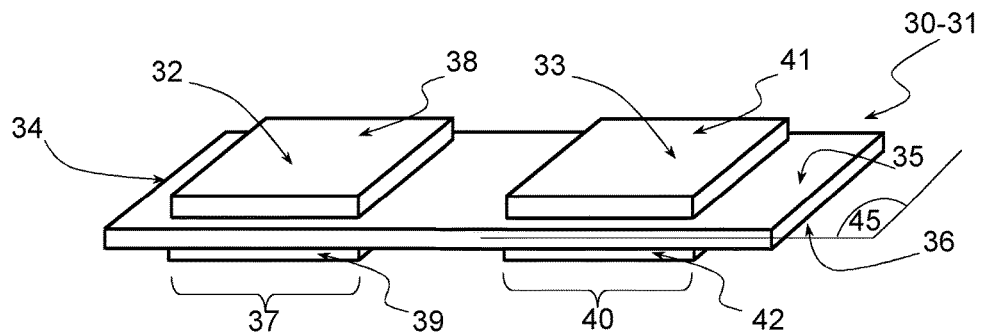
FIGS. 4A and 4B are perspective views, respectively, of a module of two unit cells and of the connector.

FIG. 4A is a perspective view of a module 30 of two unit cells of a strip of cells for a fuel cell 31, for example, planar. Module 30 comprises a first unit cell 32 and a second unit cell 33 partly forming fuel cell 31. Module 30 comprises a fuel cell proton exchange membrane 34. Membrane 34 is for example delimited by two substantially parallel surfaces. The equidistant points of the two surfaces of the membrane define a median surface 45 of planar fuel cell 31. Membrane 34 comprises an upper surface 35 and a lower surface 36 located, in the example, on either side of median surface 45. First unit cell 32 comprises a first pair 37 of electrodes facing each other and comprising a first upper electrode 38 located on the side of upper surface 35 of membrane 34 and a lower electrode 39 located on the side of lower surface 36 of membrane 34. Second unit cell 33 comprises a second pair 40 of electrodes facing each other and comprising a second upper electrode 41 located on the side of upper surface 35 of membrane 34 and a second lower electrode 42 located on the side of lower surface 36 of membrane 34. When connector 10 equips such a module, first upper electrode 38 is electrically connected to second lower electrode 42 by means of connector 10.

Advantageously, an ionic and electric insulator surrounds the electrodes of unit cells 32 and 33. For clarity, this insulator is not shown in FIG. 4A. The description of the electric and ionic insulator and of its use will be made hereafter in relation with FIGS. 5A and 5B. The unit cells have geometries generally used for fuel cells. For example, for a cell operating with dioxygen and dihydrogen, the thickness of membrane 34 is approximately 50 μm, and the thickness of the felt electrodes is approximately 250 μm. The electrodes have a surface area in the range from 0.3 cm$^2$ to 20 cm$^2$. The distance between two adjacent electrodes located on a same side of membrane 34 is greater than 0.5 mm, and the distance between an electrode and each edge of membrane 34 is greater than 0.3 mm. All these dimensions are an illustration only and should not be considered as limiting the field of application of the present invention.

Figure 4B:
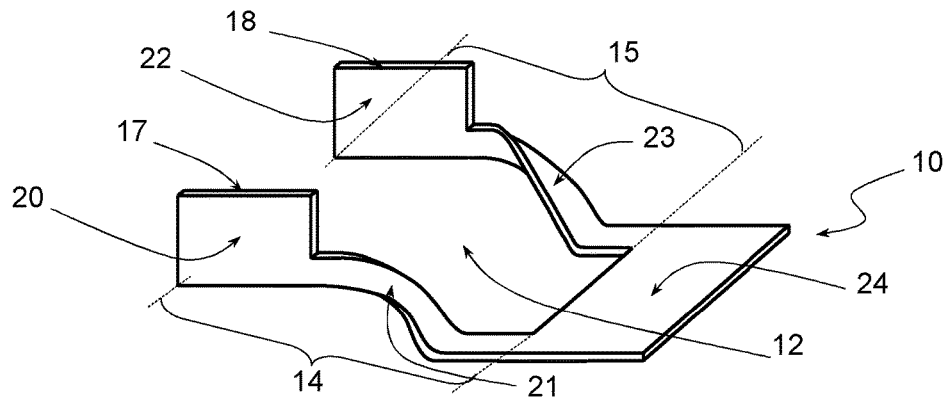

FIG. 4B is a perspective view, in a position of insertion of connector 10, previously described in relation with FIG. 3. In this example, connector 10 has been deformed to be installed on module 30 of two unit cells described in relation with FIG. 4A. First and second arms 21 and 23 are advantageously deformable to make first and second flaps 20, 22 mobile with respect to base 24. Thus, the first and second flaps may comprise a closed position and an open position (FIG. 4B) where the first and second flaps are more distant from each other than in the closed position. FIG. 4B is a view of an example of an open position of the first and second flaps for which the distance between the two flaps 20 and 22 is sufficiently large to enable to introduce module 30 of two unit cells into opening 12 of connector 10 by using an enlarged passage, created by the deformation of connector 10, between the spaced apart walls 17, 18 of slot 11.

Figure 4C:
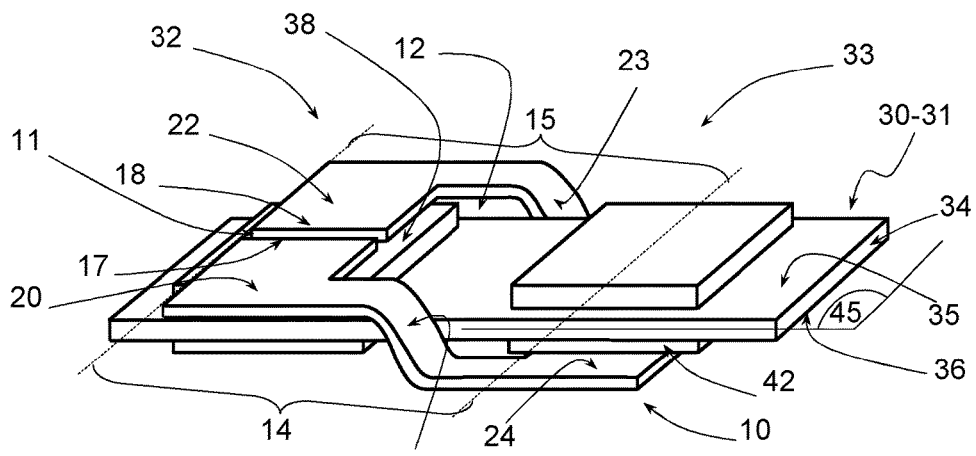
FIG. 4C is a perspective of a connector according to the present invention assembled on unit cells.

FIG. 4C is a perspective view of connector 10, described hereabove in relation with FIGS. 3 and 4B, assembled on module 30 of two unit cells, described hereabove in relation with FIG. 4A. The method for assembling electrode connector 10 on module 30 comprises, for example, the steps of:

forming an assembly 30, for example of first 32 and second 33 unit cells described hereabove in relation with FIG. 4A;

providing a connector 10 such as described in relation with FIG. 3;

spacing apart walls 17, 18, delimiting slot 11, to allow the introduction of assembly 30 of unit cells 32, 33 between arms 21, 23;

introducing assembly 30 of unit cells 32, 33 into opening 12 from spaced apart walls 17, 18;

bringing together spaced apart walls 17, 18 after the introduction step;

applying at least a portion of the first and second flaps on first upper electrode 38 located on upper surface 35 of membrane 34; and applying base 24 of connector 10 to second lower electrode 42 located on lower surface 36 of membrane 34.

Connector 10, assembled on unit cells 32, 33 of module 30 of fuel cell 31, is in a functional position which corresponds to the closed position of the first and second flaps. As compared with the position of insertion of connector 10 shown in FIG. 4B, the functional position of connector 10 is characterized, on the one hand, by the bringing together of first 17 and second 18 walls of slot 11 and, on the other hand, by the bringing together of first 20 and second 22 flaps. Further, for the functional position of connector 10, that is, in the context of the unit cell module where first upper electrode 38 is electrically connected to second lower electrode 42 by connector 10:

first and second flaps 20, 22 are applied to first upper electrode 38 of module 30;

base 24 is applied on second lower electrode 42 of module 30;

opening 12 of connector 10 is crossed by membrane 34 of unit cell module 30;

first 21 and second 23 arms are arranged on either side of membrane 34.

In the example of a planar-type fuel cell 31, the lower and upper electrodes are located on either side of median surface 45. On each side of this median surface, membrane 34 is, for example, respectively supplied with the oxidizer—for example, dioxygen—and with the fuel—for example, dihydrogen. As a result, connector 10 achieves a series connection of two unit cells 32, 33 mechanically connected by common proton-exchange membrane 34.

Figure 5A:
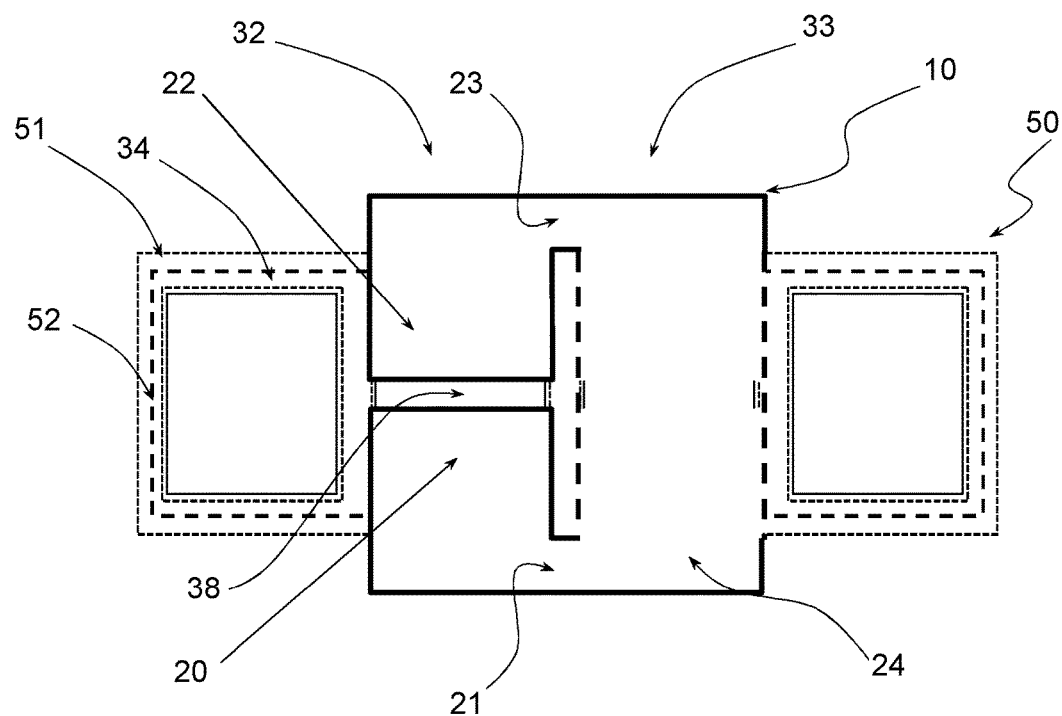
FIGS. 5A and 5B are respective top and front views of a module of four unit cells provided with a connector.
Figure 5B:
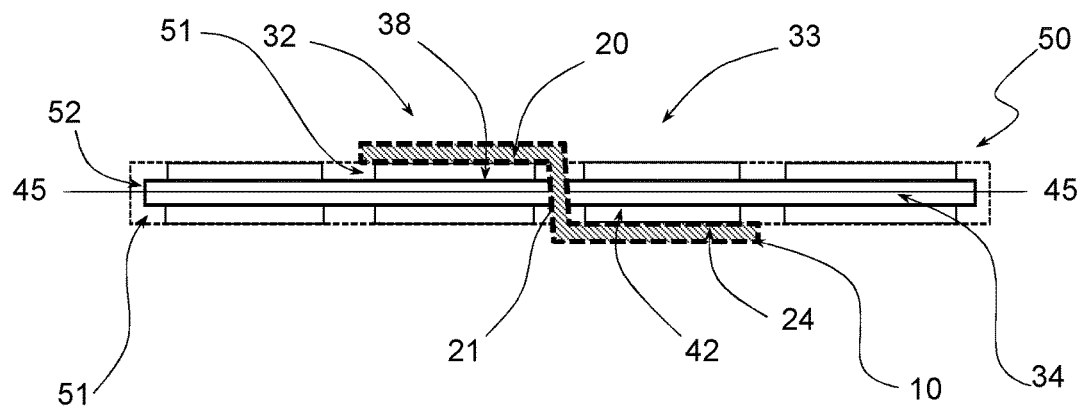

FIGS. 5A and 5B are respective top and front views of a module 50, comprising a strip of four unit cells of fuel cell 31, which is, for example, planar. Module 50 comprises, for example, the two unit cells 32, 33 described hereabove in relation with FIG. 4A.

Module 50 of four cells comprises first 32 and second cell 33, for example, in position two and three in the four positions occupied by the four cells of module 50. Module 50 of four unit cells for example comprises proton-exchange membrane 34 common to the unit cells of module 50. Membrane 34 defines median geometric surface 45 of planar fuel cell 31 configured to use module 50 of four unit cells. First 32 and second 33 unit cells are series-connected by connector 10 according to the description made hereabove in relation with FIG. 4C. Advantageously, connector 10 extends beyond the edges of the electrodes for which it provides a contact.

According to an execution mode applicable to all that has been described above, module 30 may comprise an ionic and electric insulator 51 arranged on the periphery of an electrode connected by connector 10, the insulator simultaneously adhering to membrane 34, to said connected electrode, and to connector 10. Advantageously, insulator 51 extends beyond lateral edges 52 of membrane 34. Advantageously, ionic and electric insulator 51 is in contact with the electrode edges, particularly with the edges of the first upper electrode 38 and of second lower electrode 42 connected by means of connector 10. Advantageously, the three contact elements 20, 22, 24 of connector 10 cover, in a region bordering the electrodes of the connected cells, insulator 51 along a distance extending from each of the electrodes, for example, of at least 0.8 mm. Advantageously, the insulator adheres to:

proton-exchange membrane 34;

electrodes 38, 42 of the unit cells, as well as to the edges of these electrodes;

connector 10; and another insulator of same nature.

For example, insulator 51 may be a polymer of thermoplastic elastomer type, such as a styrene-butadiene-styrene polymer known as SBS polymer. As an example, polymer "KRATON™ SBS D" produced by KRATON™ is suitable for the present invention. Other ionic and electric insulators may be used.

The method of manufacturing module 50, of four unit cells connected by means of several connectors 10, is for example described hereinafter. A first step comprises forming a strip of four unit cells comprising electrodes arranged on either side of fuel cell proton-exchange membrane 34. A second step comprises depositing, on each surface of membrane 34, a film of ionic and electric insulator 51 of thermoplastic elastomer polymer type, the film for example being cut with a shape contrary to that of the electrodes. Preferably, the thickness of the insulating film is substantially equal to the electrode height, for example, 250 μm. A third step comprises placing connector 10, for example, made of connection felt, according to the method described hereabove in relation with FIGS. 4A, 4B, and 4C. A fourth step comprises compressing, preferably at high temperature, module 50, provided with insulator 51 and provided with connector 10, to apply contact elements 20, 22, 24 of connector 10 to electrodes 38, 42 of the unit cells. The compression pressure is for example in the range from 2 kg·cm−2 to 20 kg·cm−2 and preferably from 8 kg·cm−2 to 12 kg·cm−2. The temperature, in the case of a hot compression, is sufficient to cause the melting of the thermoplastic elastomer polymer forming insulator 51 and, preferably, between 120° C. and 150° C. During this compression operation, insulator 51 is planarized and, preferably, flush with the electrode surface. Insulator 51, during the hot compression operation, is placed in contact with the edges of the electrodes of the unit cells of module 50. Consecutively to the hot compression operation, insulator 51 simultaneously adheres: to membrane 34; to electrodes 38, 42 connected by connector 10; and to connector 10, in particular in areas where connector 10 covers insulator 51 at the border of electrode 38 or 42. As a result, connector 10 is glued to the periphery of the electrodes having connector 10 applied thereto. The connection felt of connector 10 is selected to be sufficiently rigid for the gluing to result in a force of application of the connection felt on the connected electrode, in order to provide a reliable electric contact. The gluing of insulator 51 to an insulator of same nature causes the encapsulation of proton-exchange membrane 34 by insulator 51, deposited on each surface of membrane 34 and extending beyond edge 52 of membrane 34. Thus, in particular, arms 21 and 23 of connector 10, laterally located and at a distance from edges 52 of membrane 34, are insulated from membrane 34 by ionic and electric insulator 51. There is no risk of corrosion of the metal fibers contained in connector 10.

Specific embodiments of the present invention have been described. Various alterations and modifications will occur to those skilled in the art. In particular, connector 10 may be used on a module comprising a large number of unit cells. The industrial manufacturing of fuel cells using connector 10 is eased since it is possible to provide an industrial process comprising, for example, three phases. During the first phase, strips comprising tens of unit cells interconnected by a proton-exchange membrane are formed. In a second phase, the electric connections are formed by means of connector 10. Connector 10 may, according to cases, electrically connect electrodes located on either side, or on the same side, of the proton-exchange membrane (34). It is sufficient, in the case of a connection formed on electrodes located on a same side of median surface 45, to apply connector 10, in initial position with no deformation, on the electrodes. The same connector may thus form series or parallel connections of unit cells. Two unit cells interconnected by a same connector 10 are not necessarily consecutively placed on the strip of unit cells, since it is sufficient to adapt the dimension of the arms, in the longitudinal strip direction, to the distance between the unit cells to be interconnected. Finally, in a third phase, the strip provided with connectors 10 is sawn into modules, of a plurality of unit cells, forming the fuel cell to be achieved.

Besides, the electrodes have any shape, and the contact elements can then take an adequate shape to adapt to the electrode shape. Similarly, the shape of the slot or of an arm may vary, as long as they make the opening accessible by means of the connector deformation. The arm material should be deformable and electrically conductive, no matter whether or not it is made of the same material as the contact elements.

It is not necessary for the cells which are to be electrically interconnected to be mechanically interconnected. The presence of the opening for example enables to insert between an external mechanical element two different cells. The slot and the opening, associated with a deformable connector, then enable to install the connector despite the presence of this external element.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A module comprising a strip of fuel cells each having an upper electrode and a lower electrode, an upper electrode of a cell being electrically connected to a lower electrode of an adjacent cell by a connector comprising:
   a base;
   two arms extending in a same direction from two external edges of the base, the spacing between the two arms being greater than or equal to the width of the strip,
   two flaps extending towards each other from ends of the arms opposed to their connection with the base, wherein the two flaps are applied on an upper or lower electrode of a first cell, and the base is applied on an upper or lower electrode of an adjacent cell.

2. The module of claim 1, wherein the strip is coated with an adhesive insulating material on the periphery of the electrodes.

3. The module of claim 2, wherein the insulator is a polymer of thermoplastic elastomer type.

4. The module of claim 2, wherein the insulator is a styrene-butadiene-styrene polymer.

5. A connector of electrodes of a strip of fuel cells each having an upper electrode and a lower electrode, an upper electrode of a cell being electrically connected to a lower electrode of an adjacent cell by the connector, the connecter being formed from a plate of a porous, deformable, and electrically-conductive felt, comprising:
   a base;
   two arms extending in a same direction from two external edges of the base,
   two flaps extending towards each other from ends of the arms opposed to their connection with the base;
   wherein the first and second flaps form a first contact element, and the base forms a second contact element.

6. The connector of claim 5, wherein the felt comprises metal fibers.

7. The connector of claim 5, wherein the felt plate has a thickness in the range from 20 µm to 5 mm.

8. The connector of claim 7, wherein the felt plate has a thickness in the range from 50 µm to 150 µm.

9. A fuel cell having an upper electrode and a lower electrode, an upper electrode of a cell being electrically connected to a lower electrode of an adjacent cell by a connector formed from a plate of a porous, deformable, and electrically-conductive felt, comprising:
   a base;
   two arms extending in a same direction from two external edges of the base,
   two flaps extending towards each other from ends of the arms opposed to their connection with the base;
   wherein the two flaps are applied on an upper or lower electrode, and the base is applied on an upper or lower electrode.

10. The fuel cell of claim 9, wherein the strip is coated with an adhesive insulating material on the periphery of the electrodes.

11. The fuel cell of claim 10, wherein the insulator is a polymer of thermoplastic elastomer type.

12. The fuel cell of claim 10, wherein the insulator is a styrene-butadiene-styrene polymer.

* * * * *